United States Patent [19]

Spirig

[11] 4,087,814
[45] May 2, 1978

[54] INTRUDER ALARM SYSTEMS

[76] Inventor: Ernst Spirig, Movenstrasse 37, CH-8640 Rapperswil, Switzerland

[21] Appl. No.: 754,351

[22] Filed: Dec. 27, 1976

[30] Foreign Application Priority Data

Nov. 5, 1976 United Kingdom ............... 46247/76

[51] Int. Cl.² ............................................. G08B 13/18
[52] U.S. Cl. .............................. 343/5 PD; 340/258 B; 343/6 R
[58] Field of Search ............................ 343/5 PD, 6 R; 340/258 R, 258 A, 258 B

[56] References Cited

U.S. PATENT DOCUMENTS

| 2,649,538 | 8/1953 | Marlowe et al. | 340/258 B X |
| 3,691,558 | 9/1972 | Hoard et al. | 343/5 PD X |
| 3,725,888 | 4/1973 | Solomon | 340/258 B X |
| 3,727,216 | 4/1973 | Antonio | 343/5 PD |
| 3,815,131 | 6/1974 | Dautel et al. | 343/5 PD |
| 3,946,376 | 3/1976 | Galvin | 340/258 A X |

Primary Examiner—T.H. Tubbesing
Attorney, Agent, or Firm—Lawrence E. Laubscher

[57] ABSTRACT

Intruder alarm apparatus includes two detector systems each responsive to the presence of an intruder within a portion at least of a protected area and alarm means responsive to the actuation of the detectors in a predetermined logic or time sequence for signalling the presence of an intruder. One embodiment includes two microwave Doppler detectors each responding to the presence of an intruder by opening alarm contacts. The two alarm contacts are connected in parallel in the loop circuit of a closed-loop alarm system so that an alarm is given only if both detector contacts are opened simultaneously. Preferably the duration of contact opening is arranged to extend beyond the period of actual intruder response. In another embodiment, two intruder detectors spaced along a passageway each respond to the presence of an intruder by actuating an alarm contact, that detector past which an intruder must first pass in gaining access to a protected area closing its contact for a relatively long period, while the detector which will be passed later closes its contact for a short period. Thus the passage of authorized persons in the direction away from the protected area will not initiate an alarm while a person moving towards the protected area will initiate an alarm.

4 Claims, 14 Drawing Figures

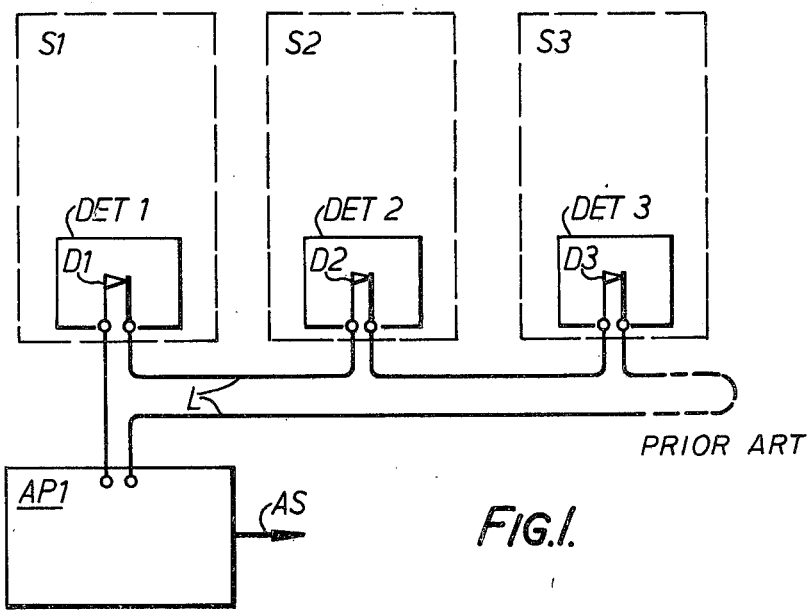
FIG.1. PRIOR ART
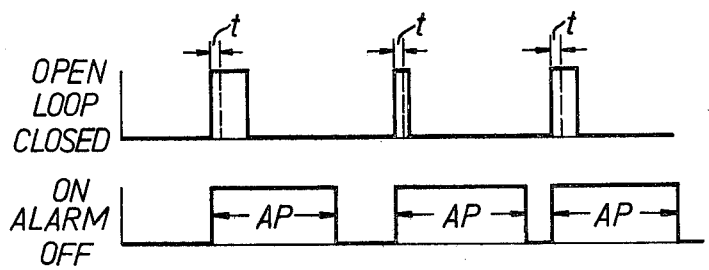
FIG.2.
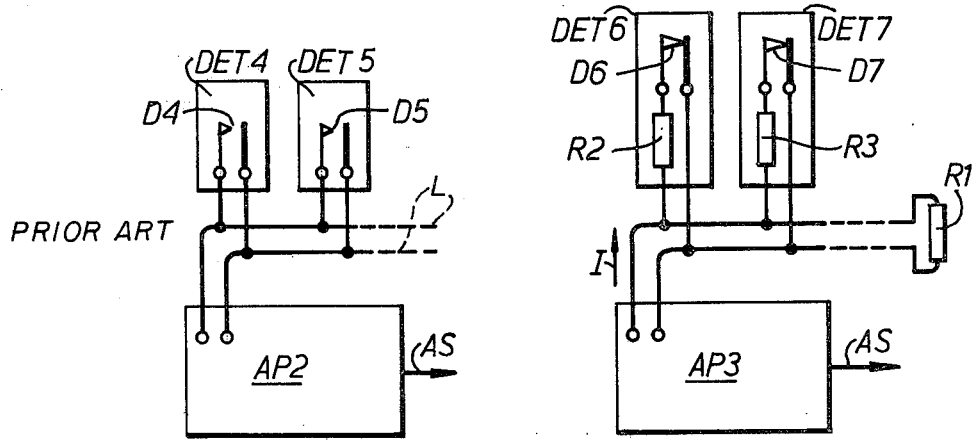
FIG.3. PRIOR ART
FIG.4. PRIOR ART

INTRUDER ALARM SYSTEMS

BACKGROUND OF THE INVENTION

1. Field of the Invention

This invention relates to improvements in intruder alarm systems.

Intruder alarm systems are liable to the occurrence of false alarm indications resulting from a variety of causes, and the elimination or reduction of such false alarms is a major requirement of such systems. False alarm signals result for the most part owing to the inability of the detecting devices used in the system to distinguish between an actual intrusion and spurious events producing similar responses by the detector. Such spurious responses may be due to the use of a detector responding to non-intrusive events occurring in the particular environment, by the maladjustment of the detector so that its detection threshold is too low, or by the incorrect selection of the region within which the detector is responsive. These false alarms are therefore originated either by the detector equipment itself, or by the incorrect installation or adjustment of the equipment.

2. Description of the Prior Art

Detection techniques used in intruder alarm systems include volumetric microwave or ultrasonic Doppler detection of movement within the protected area, passive infra-red sensors responsive to radiation emitted by an intruder, active infra-red detectors including an infra-red radiator and receiver, glass-break detectors, vibration detectors and other detector arrangements, all of which are capable of response to external technical influences which may result in an alarm signal being given.

For example, a vibration detector applied to a window may yield an alarm signal in response to a sonic boom caused by an airplane, to vibration caused by a heavy truck passing nearby, or to some similar non-intrusive event, or to vibration caused by an intruder's attempts to force the window open. Such a vibration detector does not include any intrinsic or external "intelligence" to enable it to distinguish between an actual intruder and vibration due to some other cause.

Generally, such a window vibration detector may have its sensitivity reduced so that its liability to giving false alarms is also reduced, but this will also reduce its response to vibration caused by an intruder and will thus make it easier for a skilled intruder to circumvent its operation.

Generally, the more sensitive is a particular detector device the more readily is it influenced to yield an alarm signal by disturbances other than those produced by an actual intruder and the less readily may it be circumvented by an intruder. It is therefore desirable in practice to be able to adjust the detector to a sensitivity which is as high as is compatible with absence of an excessive number of false alarms, and is therefore not readily circumvented. Appropriate adjustment of the detector is difficult because the requirements for high sensitivity and for a low rate of false alarms are diametrically opposed.

Consider, for example, an acoustic detector within an enclosed space, which is arranged to respond to specific audible frequencies of predetermined intensities and/or durations will not be able to discriminate against such audible signals originating in adjacent traffic movements, if it is set to a sensitivity high enough to respond to produce an alarm signal in response to noise made by an intruder in forcing an entrance or in moving within the space to be protected. What is required, therefore, is some form of discrimination capability or "intelligence", either built into the detector or otherwise incorporated in the alarm system, for example, within an alarm control panel, which will enable the system to discriminate between similar alarm signals due to different causes.

Taking as another example an ultrasonic Doppler intruder detector, such a device will respond not only to the presence of an intruder within the protected space but also to ultrasonic energy of frequency close to that used by the detector, such as may arise from ringing bells, or to the passage of a flying insect sufficiently close to the transmitter that substantial energy is reflected to the detector. A detector of this type will also be sensitive to changes in atmospheric conditions that affect the behaviour or propagation of ultrasonic energy within the protected space.

Ultrasonic Doppler detectors used at sensitivities such that they are capable of intruder detection at distances up to ten meters are found to be very easily influenced by the conditions mentioned above as giving rise to false alarms, and in practice such detectors are more usually adjusted to be capable of reliable intruder detection at distances not exceeding seven or more usually five meters, if a useful compromise between reliability of intruder detection and relative freedom from false alarms is required. It has been proposed to use very sophisticated signal processing circuits to operate on the detector signals in order to discriminate against responses not due to an intruder, but such arrangements render the detector costly, require skill and know-how for their correct installation and adjustment and give only slightly increased discrimination against false alarms. It is usual for such systems to include a central signal processing device into which the individual Doppler frequency-shift signal from a plurality of spaced detector units are fed.

Yet another example is a microwave Doppler intruder detector, which may have a high detection range owing to its electromagnetic propagation characteristics. Present microwave detectors are very liable to false alarms owing to their sensitivity to radio-frequency interference from transmitters, mobile radios, sparking of arc-welding equipment, lightning, flurorescent lamps in which the ionic discharge within the tube moves. False alarms may also arise from the penetration of the electromagnetic waves through the boundaries of the protected space, with the result that moving objects outside that space may give rise to alarm responses. For example, a motor-vehicle with a metal body, even though separated from the detector by substantial walls, may yet give rise to a greater response that that due to a human intruder within the protected space, owing to the differing efficiencies of metal and flesh as radar targets. Although this difficulty may be alleviated to some extent by appropriate adjustment of the sensitivity threshold of the detector, so that minimum responses are obtained from objects outside the protected space, yet such responses cannot be wholly avoided unless response to an intruder is limited to ranges of only a few meters. Once again, therefore, it is desirable to incorporate in the system a discriminator or "intelligence" capable of preventing responses to signals originating in causes other than an actual intruder.

From the examples given above it will be understood that no detector of a nature substantially more complex than a simple magnetic switch (and even such a switch may give rise to false alarms if incorrectly installed) in immune against false alarms.

Those engaged in the intruder alarm industry are currently engaged in applying much effort and skill to the development of increasingly complex and costly signal processing devices into individual detectors in order to reduce their false-alarm susceptibility. Such increased elaboration of the detector equipment leads, unfortunately, away from the manifest practical need for simple intruder detectors of high false-alarm rejection. Additionally, the more complex the apparatus the higher is its failure rate (or the lower is its reliability). Obviously, the less complex is the circuitry of a device the more reliable it will be.

In U.S. Pat. No. 3,727,216 and in U.K. Pat. No. 1,386,223 there are described intruder alarm systems employing both ultrasonic and electromagnetic Doppler detection systems and in which an AND circuit is used to correlate signals provided by the two systems so that simultaneous alarm responses by each of the two systems are required to yield an alarm output from the AND gate. This arrangement is clearly seen to be advantageous in that it greatly reduces the incidence of false alarms. It is also possible to employ other combinations of different detection systems, for example, a passive infra-red detector and a microwave detector, a passive infra-red detector and an ultrasonic detector, an interrupted beam infra-red detector and a microwave detector, an interrupted beam detector and an ultrasonic detector, since in each case the two systems of each combination yield false alarms in response to different effects.

These known systems suffer from both economic and operational disadvantages. The components of the combined systems are required to be so constructed as to provide similar logic signals and must therefore be individually designed for use in a combination with unavoidable increase in cost. It is also the case that an alarm will be given only when both systems are exactly simultaneously responsive to the presence of an intruder.

SUMMARY OF THE INVENTION

The present invention has the advantage that it may be composed of a combination of existing detector systems yielding an output signal by way of electrically insulated relay contacts, together with a known detector panel which may employ any of closed-loop, open loop or resistive loop arrangements to transfer an alarm condition created by a detector to the alarm initiating arrangement which yields an alarm signal when the loop changes condition.

In one method of carrying out the invention the outputs of a plurality of individual detectors are logically combined in a predetermined time sequence to yield an alarm output. Consider, as a very simple example, a hall or passageway in which a plurality of spaced-apart pressure-sensitive mats are placed for intruder detection. If the alarm system is arranged to provide an alarm signal only when a plurality of the mats are actuated in a predetermined sequence, corresponding to the necessary direction of movement of an intruder gaining access to a protected area, then there is practically no possibility of a false alarm being given, even though an individual mat may be actuated accidentally, for example, by an object falling upon it from an adjacent support. More complex situations are considered in the specific embodiments described below.

In an alternative mode of the invention the outputs of a plurality of detectors responsive to different aspects of an intrusion are combined, and only the presence of outputs from all the plurality yields an an alarm. Obviously, the probability that more than one detector will yield a false alarm signal at one and the same time is much lower than when a single detector only is involved, and a response from three or more differently responsive detectors yields a very high probability that an actual intrusion has taken place.

It is an advantage of the present invention that the individual detectors need not have particularly high false alarm rejection capability, but may be of simple form and relatively crude construction, since the probability of a false alarm resulting from parameters of the system of combined detectors or from incorrect adjustment of the individual detectors is very low.

BRIEF DESCRIPTION OF THE DRAWINGS

FIGS. 1 and 2 illustrate the principle of a closed-loop detection system;

FIG. 3 illustrates the principle of an open-loop detection system;

FIG. 4 illustrates the principle of a resistive loop detection system;

DESCRIPTION OF THE PREFERRED EMBODIMENTS

FIG. 1 shows schematically a known kind of alarm installation using a closed-loop system a plurality of detectors DET1, DET2 etc., of which three only are illustrated, each supervise a respective space S1, S2 etc. Each detector includes normally-closed relay contacts D1, D2, D3 — that are connected in series by way of leads L to form a normally-closed loop connected to an alarm panel AP1 that responds to a cessation of the loop current by yielding an alarm signal of a desired kind, as indicated by arrow AS. Alarm panel AP1 may be arranged to respond only when the loop is opened for at least a predetermined minimum time.

FIG. 2 illustrates the response of the alarm system of FIG. 1 to the opening of contacts D1, D2 and D3, in each case for a period in excess of a predetermined minimum time $t$. The alarm panel AS is arranged to provide an alarm output for a predetermined period AP whenever initiated.

Alarm systems using open-loop circuits are generally as indicated by FIG. 3 where two detectors DET4, DET5 each include a normally-open contact D4, D5 which in response to detection of an alarm condition is actuated to close a loop formed by leads L extending from an alarm panel AP2 responding to closing of the loop exactly as panel AP1 of FIG. 1 responded to opening of a closed loop; by yielding an alarm signal at AS.

Another known form of alarm system, illustrated by FIG. 4 uses a resistive loop closed by a terminating resistance R1 at the end furthest from alarm panel AP3 and having shunted across it at each detector DET6, DET7 the series combination of an individual resistor R2, R3 and an alarm contact D6, D7. Any interference with the loop conditions, by the opening of an alarm contact D6, D7 or otherwise will change the value of current I flowing in the loop and alarm panel AP3 is arranged to respond to any substantial change in current by providing a predetermined alarm response at AS.

Figure 5:
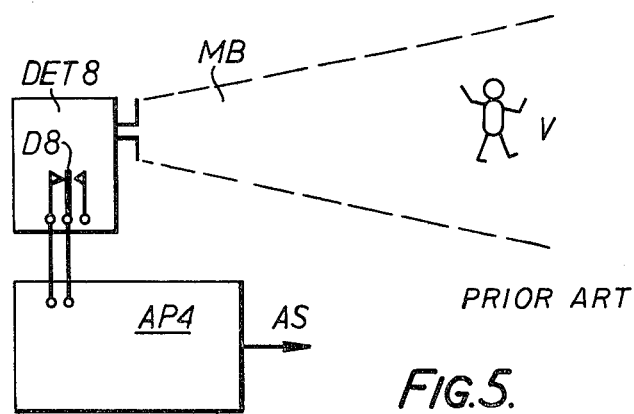
FIG. 5 illustrates schematically a microwave intruder detection system.
Figure 6:
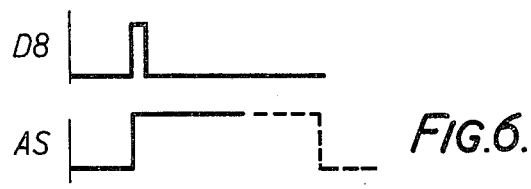
FIG. 6 is a diagram explaining the operation of the system described with reference to FIG. 5.

A known microwave intruder detection system uses any substantial variation in the microwave conditions within a protected space to cause the initiation of an alarm. Such a system is illustrated in FIG. 5 where a microwave detector DET8 radiates a microwave beam MB and in response to the presence within the irradiated space of an intruder V gives an alarm indication by opening contacts D8, thus causing an alarm panel AP4 to yield an alarm at AS. The action is illustrated by FIG. 6 where lines D8 and AS represent respectively the opening of contact D8 and the resultant development of an alarm signal.

Figure 7:
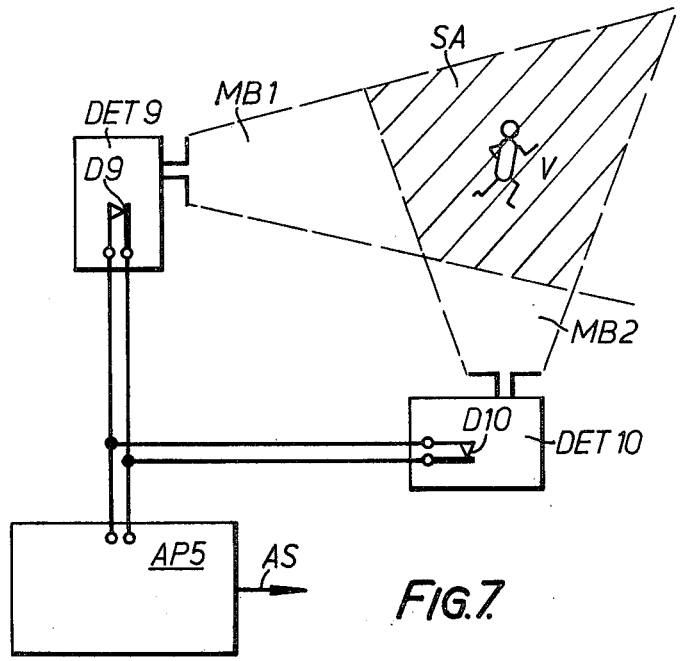
FIG. 7 illustrates schematically an embodiment of the invention.
Figure 8:
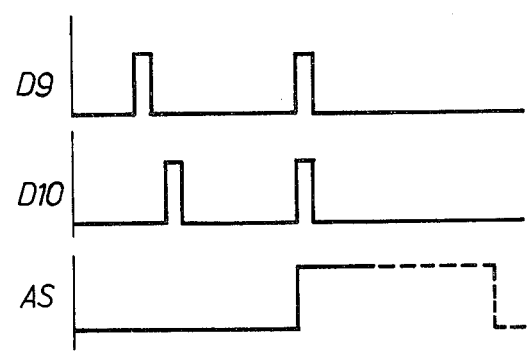
FIGS. 8 and 9 are diagrams explaining alternative modes of operation of the system described in relation to FIG. 7.

FIG. 7 shows an alarm system in which two microwave detectors DET9 and DET10 emit respective microwave beams MB1 and MB2 and, in response to changes in microwave conditions within the respective beam, caused for example by the entrance of an intruder V, yielding an alarm indication by opening a respective contact D9 or D10. Contacts D9 and D10 are connected in parallel in a closed-loop circuit of an alarm panel AP5 so that, as is illustrated by FIG. 8, the individual opening of contacts D9 and D10 does not result in the development of an alarm signal AS by alarm panel AP5, whereas the simultaneous opening of these contacts does produce an alarm signal.

It will be observed that brief openings of the microwave detector alarm contacts, for about one second, for example, means that unless close coincidence exists between the instants at which the two detectors respond, an alarm may not be given in response to the presence of an intruder. When commercially available detectors are used in the system, as is desirable for economic reasons, they will not have very exactly matched responses and the close coincidence of response necessary to trigger the alarm panel may exist only when an intruder is relatively close to both detectors, where even small movements of an intruder will be detected at longer distances of say, 10 meters the required coincidence may not occur.

Figure 9:
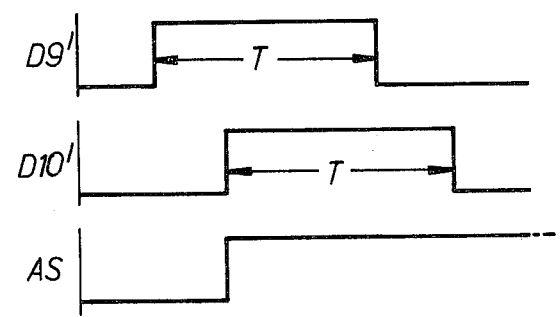

This difficulty may be overcome either by extending the duration of closure of the alarm contacts whenever they are actuated. This arrangement is illustrated in FIG. 9, where in response to non-coincident detections of an intruder, contacts D9' and D10' are opened for an extended time period T, which may be from 3 - 30 seconds. The longer the extended time period the less critical are the distances between the detections and the matching of their sensitivity.

When the later detection occurs during the extended period following the earlier detection, as is shown, an alarm output AS is initiated.

Figure 10:
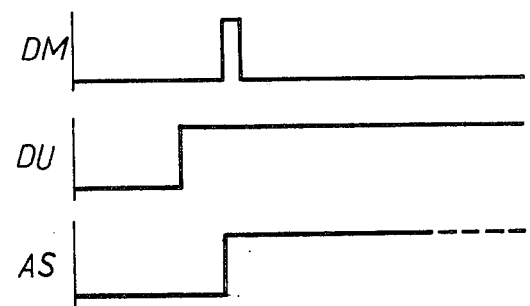
FIG. 10 is a diagram explaining the operation of another embodiment of the invention.

FIG. 10 illustrates the operation of an arrangement applicable to the invention in which, instead of two similar detectors, as in FIG. 7, a microwave detector with an alarm contact DM is used in combination with an ultrasonic detector with an alarm contact DU. These controls are connected in parallel to a closed-loop alarm panel as in FIG. 7. In this case, however, it is arranged that one of the alarm contacts, contact DU as shown, once closed, remains closed as long as disturbance of the standing-wave pattern persists. Then as soon as contact DM closes, for however brief a period, the alarm panel will response and yield an alarm signal AS.

Figure 11:
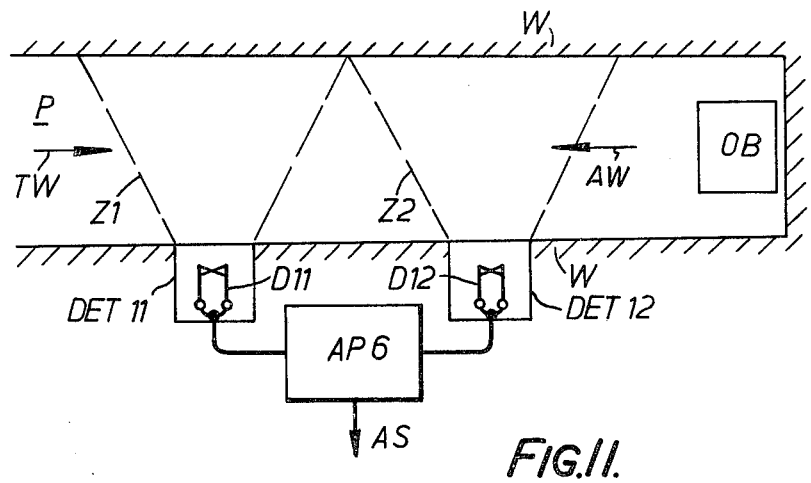
FIG. 11 illustrates schematically another embodiment of the invention.
Figure 12:
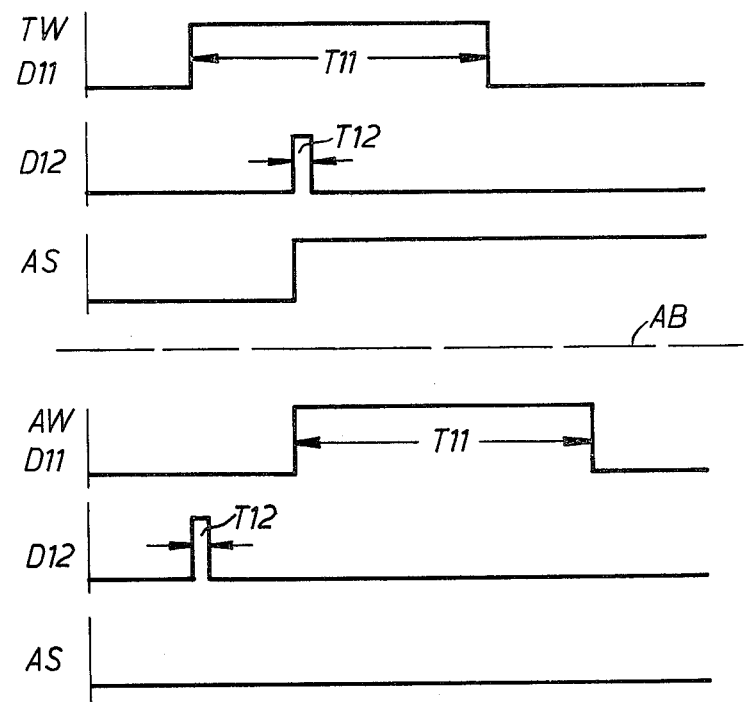
FIG. 12 comprises diagrams explanatory of the operation of the system described in relation to FIG. 11.

FIG. 11 illustrates an embodiment of the invention employing the arrangement of FIG. 10 to provide directional discrimination as regards the movement of an intruder. Access to a protected object OB is to be had only by way of a passage P between walls W. The space between walls W is supervised by two detectors DET11 and DET12 having non-overlapping detection zones Z1, Z2. The two detectors have respective alarm contacts D11, D12 that are connected to a common alarm panel AP6. The operation of this alarm system is illustrated by FIG. 12, where the diagrams above broken line AB relate to movement of an intruder in the direction towards the protected object, as indicated by arrow TW and the diagrams below line AB relate to movement in the direction away from object OB, as indicated by arrow AW.

When detector DET11 senses an intruder, its alarm contact D11 is arranged to be actuated for a predetermined, relatively long period, while when detector 12 senses an intruder its alarm contact D12 is arranged to be actuated for a relatively much shorter period. When an intruder passes along passage P, detector contact D11 will first be actuated for a period T11 and during this period detector contact D12 will be actuated for the shorter period T12, thus initiating an alarm AS from panel AP6.

If, on the other hand, detector DET12 first responds to an intruder condition its contact D12 will remain closed only for the shorter period T2 which will not includes the period T11 in which contact D11 of detector DET11 is actuated. Thus an alarm will not be given by this illogical sequence of events. Some protection against false alarms is thus obtained.

Figure 13:
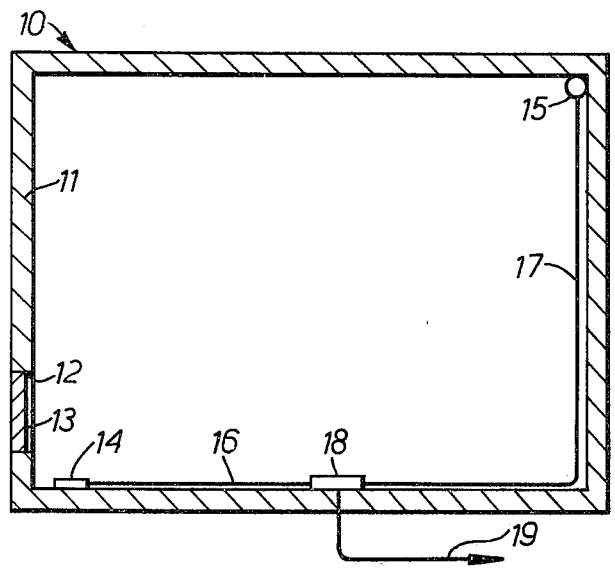
FIG. 13 schematically illustrates an embodiment of the invention employing the combination of an ultrasonic detector and a vibration detector.

In the embodiment of intruder detection system in accordance with the invention which is illustrated by FIG. 13, a strong-room 10 to be protected (shown in plan) is enclosed by a wall 11, pierced by a doorway 12 which, when the strong-room is secure, is closed by a door 13. Intruder detection responsive to any intruder gaining access to the strong-room is provided by a vibration-responsive detector 14 mounted on the wall 11 of the strong-room and by an ultrasonic Doppler detector 15 mounted on one corner of the room. When one of detectors 14, 15 is excited by vibration or by the presence of a moving object within the space, respectively, it yields an output signal over a respective lead 16, 17 to an alarm responsive apparatus 18 which is arranged to provide an output alarm-initiating signal over a tamperproof lead 19 only if output signals from both detectors are simultaneously present. This may readily be done by arranging that the response of each detector causes the opening of a respective set of electrical contacts. If now the two sets of contacts are connected in parallel in the control circuit closed-loop alarm device, that is, an alarm device which will cause an alarm to be given upon the opening of its control circuit, then an alarm will be given only as a result of the presence of an actual intruder within the strong-room.

Figure 14:
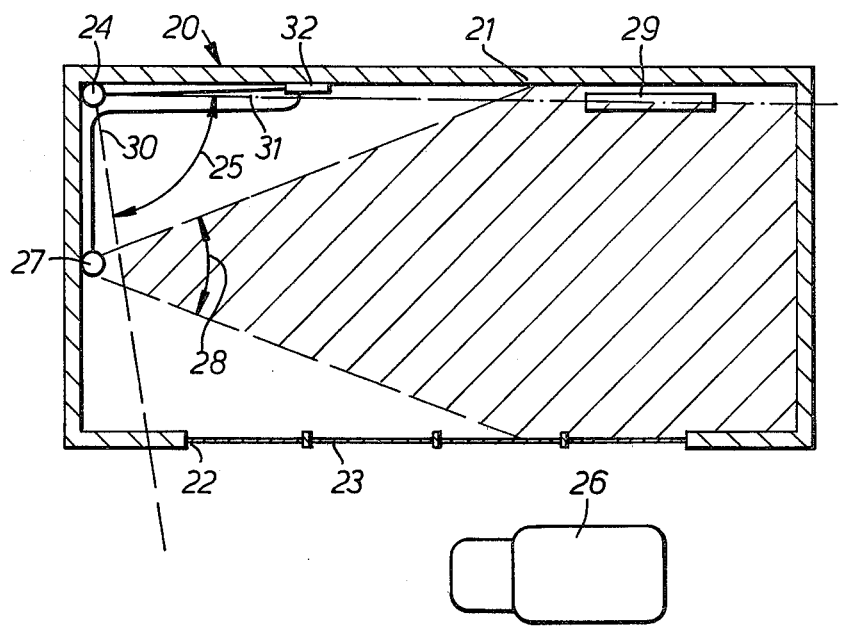
FIG. 14 schematically illustrates another embodiment of the invention employing the combination of an infra-red detector and a microwave Doppler detector.

The embodiment illustrated by FIG. 14 illustrates an intruder detection system in accordance with the invention applied to the protection of a warehouse 20 enclosed by a wall 21 in which is a large aperture 22 closed by doors 23. In this embodiment the protection is provided by a microwave Doppler detector 24 having a beam width 25 such as to include almost all of the interior of the warehouse. However, because of the penetration of microwaves through the structure of a normal building, a motor vehicle 26 moving outside the building will be detected by the microwave detector as a moving object. Further protection is provided in this instance by a passive infra-red sensor 27 having a beam width 28.

The warehouse is, however, provided with a heater 29 situated within the response zone of the detector 27, so that if this heater comes into action during a secure period when the detector system is in operation a false alarm by the passive infra-red detector 27 can arise from this cause.

To avoid the difficulties mentioned above and in accordance with the invention the response signals from detectors 24 and 27 are applied over respective leads 30 and 31 to an alarm control device 33 arranged to yield an alarm only when both detectors respond. This may be done by the arrangement described above in relation to FIG. 1.

The response of the system described in relation to FIG. 2 to a variety of conditions is shown in Table I.

TABLE I

| CAUSES OF FALSE ALARMS | PASSIVE INFRA-RED | MICROWAVE |
| --- | --- | --- |
| Van detection by penetration through wall | no | yes |
| Hot air heater | yes | no |
| Door vibrations (due to a storm) | no | yes |
| Insect, birds flying close by the detector | yes | yes |
| Air turbulance | no | no |
| Acoustical noises | no | no |
| Actual intruder moving in the overlapping sensitivity zone | yes | yes |

In a further embodiment of the invention, also illustrated by FIG. 14, the passive infra-red detector 27 which at present is a somewhat costly device, is replaced by an ultrasonic Doppler detector, which is less costly. The following Table II illustrates the response of this alternative combination of detectors.

TABLE II

| CAUSES OF FALSE ALARMS | ULTRASONIC | MICROWAVE |
| --- | --- | --- |
| Actual intruder in the overlapping sensitive zone | yes | yes |
| Van detection by penetration through wall | no | yes |
| Hot air heater | yes | no |
| Air turbulance | yes | no |
| Acoustical noises | yes | no |
| RFI radio frequency interferences, mobile radio, sparking of welding equipment, lightning, airplanes radio altimeter, etc. | no | yes |
| Moving water, sewage in plastic pipes | no | yes |
| Moving elevator behind the wall, moving machinery behind wall | no | yes |
| Leaky pressurized air pipe joint creating ultrasonic noise, bells ringing | yes | no |
| Fluroescent lamps | no | yes |
| Birds, insects moving close to the detectors | yes | yes |

It will be seen from Table II that an actual movement in the overlapping sensitive zones of the two detectors will yield an alarm. Thus a source of false alarms could notionally be flying insects or birds, more particularly in large buildings such as aircraft hangers. However, a false alarm can result from this cause only if the two detectors are close together, since a small living creature such as a bird or insect must pass very close to a detector to yield an alarm condition, the time taken by the object giving rise to the false responses in moving from a position close to one detector to a position close to the other detector will prevent simultaneous responses occurring in the two detectors. There is also a very low statistical probability that such an object will in fact pass close to both detectors within a short space of time.

It may be advantageous to employ detector arrangements of which the alarm duration may be individually adjusted over a wide range.

I claim:

1. In an intruder detection system for detecting the presence of an intruder within a protected area, said system including a plurality of intruder detector means each individually responsive to the presence of an intruder within a zone of said protected area to provide a predetermined intruder-responsive signal, and alarm means responsive to the presence of a plurality of said intruder-responsive signals to develop an alarm signal; the improvement wherein said alarm means is operable only when said detector signals occur in a predetermined sequence logically representing the steps taken by an intruder to enter the protected area.

2. The improvement claimed in claim 1, wherein a first one of said detector means is operable to provide a first intruder-responsive signal for a relatively short time duration, and a second one of said intruder detector means is operable to develop a second intruder-responsive signal persisting for a longer time duration, said alarm means being arranged to develop said alarm signal only when said second intruder detector means responds prior to said first intruder detector means.

3. The improvement claimed in claim 2, wherein each of said intruder detector means includes electrical alarm contacts operable in response to the detection of an intruder to provide the intruder-responsive signal, and further wherein said alarm means includes an electrical loop circuit an electrical characteristic of which is modified only in response to simultaneous actuation of all of said alarm contacts.

4. The improvement defined in claim 1, wherein two of said intruder detector means are spaced longitudinally of a passage leading to an object to be protected, said alarm means being operable to develop said alarm signal only when the intruder detector means nearer to the object responds subsequent to the response of the intruder detector means arranged farther from the object.

* * * * *